United States Patent
Bourgoine et al.

(10) Patent No.: US 8,978,497 B2
(45) Date of Patent: Mar. 17, 2015

(54) LINEAR ACTUATOR WITH ANTI-ROTATION MECHANISM

(75) Inventors: Ryan H. Bourgoine, Buffalo, MN (US); Gary W. Rosengren, Brooklyn Park, MN (US); Brett C. Holker, Monticello, MN (US)

(73) Assignee: Tolomatic, Inc., Hamel, MN (US)

( * ) Notice: Subject to any disclaimer, the term of this patent is extended or adjusted under 35 U.S.C. 154(b) by 302 days.

(21) Appl. No.: 13/481,265

(22) Filed: May 25, 2012

(65) Prior Publication Data

US 2012/0297908 A1 Nov. 29, 2012

Related U.S. Application Data

(60) Provisional application No. 61/490,189, filed on May 26, 2011.

(51) Int. Cl.
- *F16H 3/06* (2006.01)
- *F16H 27/02* (2006.01)
- *F16H 29/02* (2006.01)
- *F16H 29/20* (2006.01)
- *F16H 25/20* (2006.01)

(52) U.S. Cl.
CPC .......... *F16H 25/20* (2013.01); *F16H 2025/204* (2013.01); *F16H 2025/2075* (2013.01)
USPC ........................................ 74/89.34; 74/89.23

(58) Field of Classification Search
CPC ................ F16H 25/20; F16H 25/2204; F16H 2025/204; F16H 2025/2075; F16H 2025/2081; F16H 2025/2445; F16H 2025/2436; F16H 57/021; B23Q 5/404
USPC ............ 74/89.23, 89.32, 89.33, 89.36, 89.37, 74/89.34, 89.31, 89.39, 424.71, 441; 384/46, 58
See application file for complete search history.

(56) References Cited

U.S. PATENT DOCUMENTS

| | | | | |
|---|---|---|---|---|
| 2,738,685 | A | * 3/1956 | Hartz et al. | 74/89.37 |
| 5,054,968 | A | * 10/1991 | Eckman | 408/97 |
| 5,302,031 | A | * 4/1994 | Yuasa | 384/449 |
| 5,560,251 | A | * 10/1996 | Babinski | 74/424.86 |
| 5,722,304 | A | 3/1998 | Allen | |
| 6,067,868 | A | 5/2000 | Nakamura et al. | |
| 6,073,505 | A | 6/2000 | Yuda | |
| 6,101,889 | A | 8/2000 | Laskey | |
| 6,276,223 | B1 | * 8/2001 | Kimura et al. | 74/424.81 |
| 6,603,229 | B1 | 8/2003 | Toye, IV | |
| 6,981,428 | B2 | 1/2006 | Donald et al. | |
| 7,213,796 | B2 | 5/2007 | Laforest | |
| 7,541,707 | B2 | * 6/2009 | Hochhalter et al. | 310/80 |
| 7,690,293 | B2 | 4/2010 | Bensley et al. | |
| 8,316,729 | B2 | * 11/2012 | Schunke | 74/89.23 |
| 2002/0020234 | A1 | * 2/2002 | Smith et al. | 74/89.36 |
| 2004/0036364 | A1 | * 2/2004 | Kondo | 310/49 R |
| 2006/0156838 | A1 | * 7/2006 | Las Navas Garcia | 74/89.23 |
| 2006/0207359 | A1 | * 9/2006 | Kowalski | 74/89.23 |
| 2008/0152515 | A1 | 6/2008 | Karg et al. | |
| 2010/0139427 | A1 | 6/2010 | Yamaguchi et al. | |

* cited by examiner

*Primary Examiner* — David M Fenstermacher
*Assistant Examiner* — Jake Cook
(74) *Attorney, Agent, or Firm* — Dorsey & Whitney LLP

(57) ABSTRACT

An assembly comprises a housing, a motor within the housing, and a thrust tube with an anti-rotation mechanism. The motor comprises a hollow rotor. An externally threaded screw shaft is coupled to the hollow rotor for rotation therewith. An internally threaded nut is coupled to the externally threaded screw shaft, wherein rotation of the screw shaft causes the nut to move axially. The thrust tube is operably connected with the nut, and the anti-rotation mechanism is attached to the thrust tube to substantially prevent rotation relative the housing.

20 Claims, 4 Drawing Sheets

LINEAR ACTUATOR WITH ANTI-ROTATION MECHANISM

CROSS-REFERENCE TO RELATED APPLICATIONS

This application claims priority to U.S. Provisional Application No. 61/490,189, filed May 26, 2011, the entirety of which is hereby incorporated by reference herein.

FIELD OF THE INVENTION

The present disclosure relates generally to electrically powered linear actuators and more particularly to electrically powered actuators having an anti-rotation mechanism and adapted for a variety of robotic and other applications. The various embodiments the actuators are not limited by, but may have application to, the control of robotic, pedestal, and fixture welding guns and welding guns such as those utilized in various industries such as the automotive industry; to the injection molding field and applications requiring a short stroke; to the actuation of clamping fixtures and the like in various industries such as the automotive industry; and to the linear movement of various apparatus requiring highly accurate positioning, among others.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present disclosure, it is believed that the various embodiments of the present disclosure will be better understood from the following description taken in conjunction with the accompanying Figures, in which:

DETAILED DESCRIPTION

The present disclosure relates to novel and advantageous actuators for use in providing controlled and accurate linear movement to a workpiece. Particularly, the present disclosure relates to novel and advantageous electrically powered linear actuators and to electrically powered actuators having an anti-rotation mechanism and adapted for a variety of robotic and other applications.

Although the actuators of the present disclosure have applicability to a variety of workpieces and in a variety of industries, they may have particular application to the actuation of welding guns, clamping fixtures, injection molding fixtures and other application in which controlled and accurate linear motion is required. One embodiment in accordance with the present invention has use in an application with a relatively short, but highly accurate, thrust stroke, although its use is not limited to that application.

In describing the actuator embodiments of the present disclosure, the terms "proximal" and "distal" will sometimes be used to define directions/orientations relative to the actuator. Specifically, the term "distal" shall mean the direction which is toward the workpiece connection end of the actuator, while the term "proximal" shall mean the direction which is away from workpiece connection end of the actuator.

Figure 1:
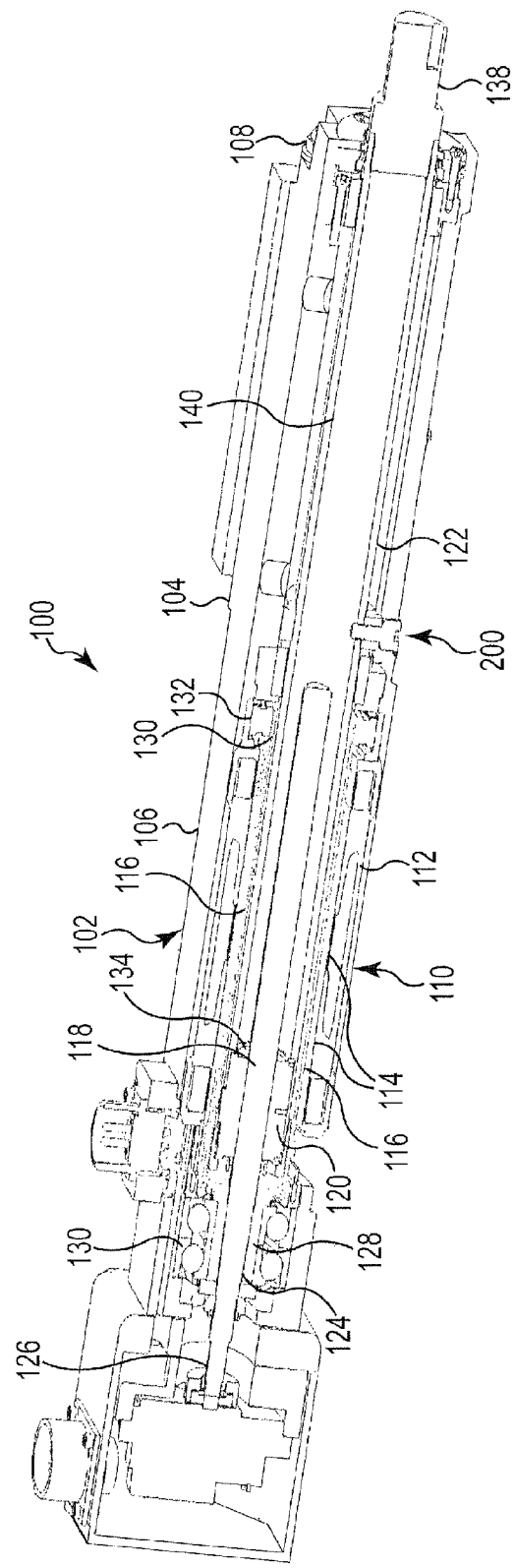
FIG. 1 is a cross-sectional, perspective view of an actuator in accordance with an embodiment of the present disclosure.

FIG. 1 illustrates a cross-sectional, perspective view of one embodiment of an electric actuator of the present disclosure. One example of an electric actuator in which an anti-rotation mechanism as described herein may be applied is the electric actuator described in U.S. Pat. No. 7,541,707, which is hereby incorporated by reference herein in its entirety.

In general, the various embodiments of the present disclosure may utilize what is often referred to in the art as a hollow shaft motor comprising motor windings and a rotor which surround a centrally located linear thrust mechanism. However, such a motor is not required to practice many features of the invention.

More particularly, an actuator 100, as shown in FIG. 1, may include an actuator housing 102, which in some embodiments may be comprised of a distal housing end 104 and a proximal housing end 106, and, optionally, any suitable number of centrally positioned peripheral housing portions. The distal housing end 104 and proximal housing end 106, and any centrally positioned housing portions, may be retained together by one or more elongated threaded members 108. A hollow shaft or other motor 110 comprising a plurality of motor windings 112, a plurality of motor magnets 114, and a rotor 116 can be positioned radially inwardly of the housing 102.

In one embodiment, an externally threaded, elongated shaft or lead screw 118 and an internally threaded nut 120 can together comprise a linear thrust mechanism. The linear thrust mechanism, comprised of the screw 118 and the nut 120, can be positioned radially inwardly from the rotor 116 and may function to convert rotational motion of the rotor 116 to linear movement of a thrust tube or load transfer member 122. As shown, the rotor 116 may surround a substantial portion of the thrust mechanism.

More specifically, the elongated, externally threaded screw 118 may include a main, externally threaded section, which may be provided with continuous threads along a substantial portion of its length. As used herein, the term "thread" or "threaded" to define the threaded section of the screw 118 may include any conventional or other threads such as ACME threads, roller screw threads, ball nut threads, or any other suitable means to convert rotational motion to linear motion.

The proximal end of the screw 118 may include a tapered section 124 which tapers inwardly toward the proximal end. The proximal end may comprise a reduced diameter end section 126 designed for connection to a rotation sensing portion of a rotary encoder. The tapered section 124 may extend through a hub 128 and may be operably connected for rotation with such hub 128. In one embodiment, the hub 128 can include an inner surface having a taper similar to the taper of the section 124.

A thrust bearing 130 may be positioned radially outwardly from the hub 128 and may function to mount and support the hub 128 and thus the proximal end of the screw 118 within the housing 102. In some embodiments, the rotor 116 and hub 128 may comprise a single, integrated component. In other embodiments, the rotor 116 and hub 128 may be separate components, as described in detail in U.S. Pat. No. 7,541,707, incorporated by reference herein.

In such an embodiment, for example, the proximal end of the rotor 116 can be connected with an axially extending rotor mounting portion of the hub 128. This can be a substantially rigid connection so that rotation of the rotor 116 causes corresponding rotation of the hub 128 and the screw 118.

A rotary encoder or other similar means may be mounted to the end section 126 of the threaded screw 118, either directly or through a coupling. For example, a selectively connectable encoder housing portion may be provided.

The encoder housing portion may be provided with an encoder. Such encoder may comprise any one of a variety of encoder models and configurations. The encoder housing portion can be selectively connectable to the actuator by threaded connections or other conventional connection means. If needed, a coupling member can be provided between the proximal end 126 of the screw 118 and the positioning sensor or rotation sensing member of the encoder.

Because of axial and other forces being applied to the screw 118 during operation, it may be desirable for the body of the encoder to be connected to the actuator housing through a flexible mount, such as flexible mounts known in the art. In one embodiment, the encoder can be a hollow shaft encoder (either incremental or absolute) having a central rotation sensing member or portion mounted directly onto the proximal end extension 126 of the screw 118.

The motor 110 may be a hollow shaft motor comprising a centrally located, hollow rotor 116 and one or more stationary motor windings 112. The windings 112 can be positioned radially outwardly of the rotor 116 and may be fixed relative to the actuator housing 102. The rotor 116 may be a generally cylindrical member having a generally cylindrical outer surface and a hollow cylindrical interior surface.

In some embodiments, the distal end of the rotor 116 can be provided with a recessed portion 130 to accommodate a bearing 132. The bearing 132 may be an axial floating bearing which supports and stabilizes the distal end of the rotor 116 relative to the housing 102. Because the bearing 132 may be allowed to float axially, it can accommodate thermal expansion of the rotor 116 during operation.

The central portion of the rotor 116 may be provided with a plurality of motor magnets 114. As shown, the magnets 114 may be mounted so that they extend axially along an outer surface of the rotor 116 between its proximal and distal ends. In some embodiments, the magnets 114 can be inlaid within an outer surface portion of the rotor 116.

Specifically, axially extending portions of the outer surface of the central portion of the rotor 116 may be removed by machining or the like to form axially extending channels or grooves around the cylindrical periphery of the rotor. These channels or grooves permit the magnets 114 to be inlaid within these channels or grooves in the outer surface of the rotor 116. This may provide the rotor 116 with thicker wall sections at the proximal and distal ends extending axially outwardly on either side of the magnets 114 and thinner wall sections in the channel areas where the magnets are mounted. This structure may also provide a radially thicker, axially extending rib or section between adjacent magnets 114 and between adjacent channels.

This magnet mounting structure can enable the mass of the rotor 116 to be reduced in the area of the thinner walls, while still providing sufficient material in the form of the axially extending ribs to preclude or limit core saturation of the magnets. The ribs can provide at least two functions. First, they can facilitate simple assembly without additional tooling for alignment. Second, they can provide additional material to reduce or prevent core saturation due to the high flux of the magnets. Because the rotor wall thickness in the area of the channels can be very thin, without this additional material of the ribs, saturation is likely to occur. This added material of the ribs also aids in prevention of flux leakage into the rotor core.

In a further embodiment, the outer or proximal and distal ends of the rotor can be provided with a plurality of holes or apertures extending through the wall sections for the purpose of reducing inertia of the rotor 116. This, in turn, can reduce the amount of torque required to accelerate and/or decelerate the rotor 116.

The linear motion or thrust assembly of one embodiment of an electric actuator of the present disclosure may include the thrust tube or load transfer member 122, the threaded nut 120, and the threaded screw 118. Other embodiments of a thrust assembly are described in U.S. Pat. No. 7,541,707, incorporated by reference herein. Still further, the thrust assembly may include any other suitable connection mechanism known in the art.

In some embodiments, a cushion or impact reducing member 134 can be provided on the distal side of the nut 120. This member 134 may be an O-ring or other suitable compressible material. During operation, this member 134 may prevent or limit damage to the nut 120 in the case of a runaway or during power up procedures.

The nut 120 may be connected with the proximal end of the thrust tube 122. In one embodiment, the nut 120 may be held in a pocket of the thrust tube located between the proximal end of the thrust tube and a locking end cap 136, which connects with the proximal end of the thrust tube. As such, in some embodiments, the nut 120 may be held entirely within this pocket of the thrust tube 122 and the locking end cap 136.

The nut 120 may include internal threads which mate with the external threads on the outer surface of the screw 118. As described above with respect to the screw 118, the internal threads of the nut 120 and the external threads of the screw 118 may be any conventional or other threads such as ACME threads, roller screw threads, ball or ball nut threads, or any other suitable means to convert rotational motion to linear motion. In one embodiment, the threads of the nut 120 and the screw 118 can be recirculating ball threads.

As described above, the proximal end of the thrust tube 122 can be connected with the nut 120. Accordingly, the nut 120 and the thrust tube 122 move axially in unison along the screw 118. The distal end of the thrust tube 122 may include a workpiece connection member 138 to which a workpiece may be connected.

The thrust tube 122 may include an elongated, outer hollow tubular portion 140, which extends between its proximal and distal ends. The tubular portion 140 may have a hollow interior to receive and accommodate the threaded lead screw 118. In some embodiments, the exterior of the tube 122 can be provided with a pair of diametrically opposed anti-rotation flat portions, as described in U.S. Pat. No. 7,541,707, incorporated by reference herein, and engage corresponding inner flat surfaces in the distal housing end 104 to prevent the thrust tube 122, and thus the nut 120, from rotating. In other embodiments, the flat portions may comprise a hexagonal exterior configuration, or other suitable geometrical configuration, instead of diametrically opposed portions.

In other embodiments, however, the actuators described herein may include alternative or additional anti-rotation mechanisms, such as the anti-rotation mechanism 200 illustrated in FIGS. 1-4. Generally, an anti-rotation mechanism 200 may prohibit the rotation of the thrust tube 122 such that a tooling may be attached directly to the actuator, such as via the workpiece connection member 138, without the need for any external guide member to prohibit rotation of the thrust tube.

Figure 2:
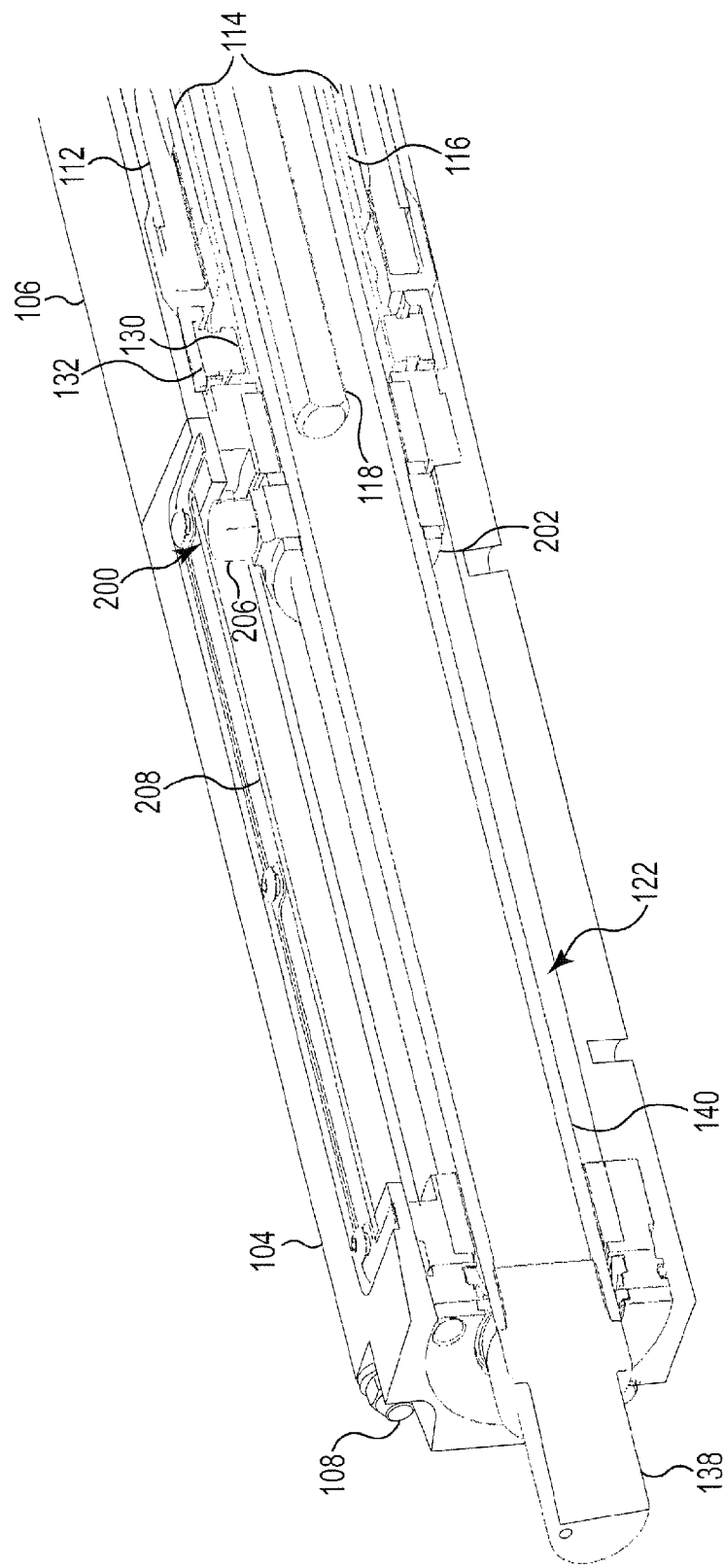
FIG. 2 is a cross-sectional, perspective view of an anti-rotation mechanism in accordance with an embodiment of the present disclosure.

As illustrated in FIGS. 1-4, with particular reference to FIG. 2, an anti-rotation mechanism 200, according to one embodiment of the present disclosure, may include a collar 202 integral with or operably fastened to the thrust tube 122. Although shown as fastened around the entire circumference of the thrust tube 122, the collar 202 need not be so limited. The collar 202 may be fastened to the thrust tube 122 by any number of means, including but not limited to, welding, adhesively, friction fit, bolted or screwed, etc., or any combination thereof.

Figure 3:
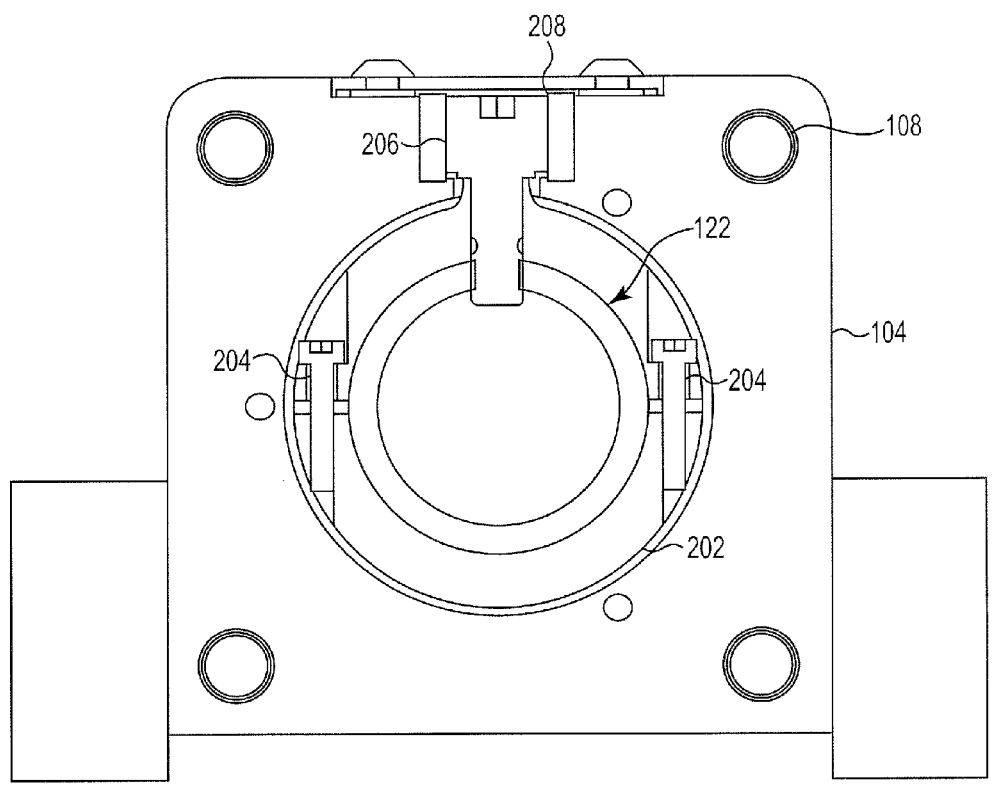
FIG. 3 is a cross-sectional view of a collar of an anti-rotation mechanism in accordance with an embodiment of the present disclosure.
Figure 4:
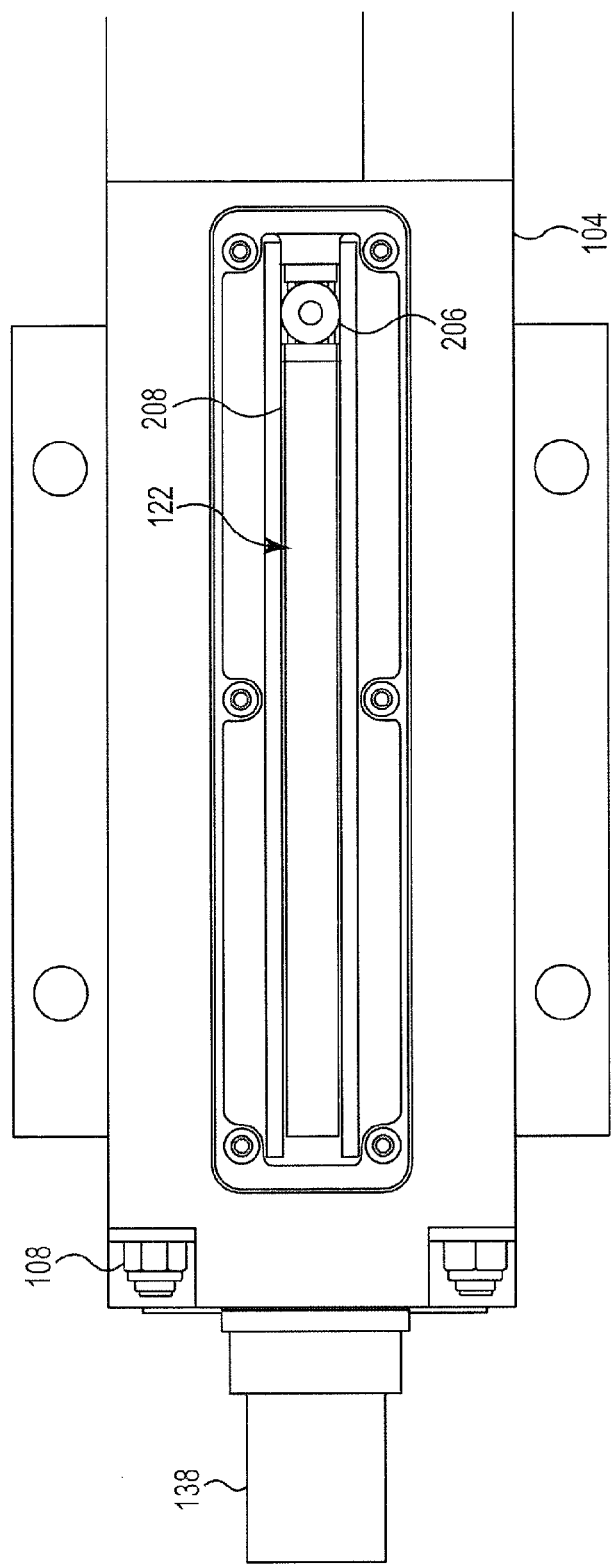
FIG. 4 is a top view of an anti-rotation mechanism in accordance with an embodiment of the present disclosure.

As illustrated in FIG. 3, in one embodiment, the collar 202 may include two or more pieces, such as two halves, which together wrap around the circumference of the thrust tube 122 or a portion thereof. The two or more pieces may be coupled together by screws 204, or any other suitable means for coupling the pieces together.

The collar 202 may include a cam follower 206, such as but not limited to a stud-type cam follower, which can generally be a roller bearing on a stud. The cam follower 206 may be positioned within a track, groove, or window 208 formed in the actuator housing 102.

The track 208 may be generally linear in nature and may be any suitable length, although a length equivalent to or substantially equivalent to the linear range of the thrust tube 122 may be desirable in most cases. Accordingly, the cam follower 206 by virtue of it riding in the track 208 of the actuator housing 102 and substantially contained within the walls thereof can prevent rotation of the thrust tube 122, thereby converting rotational motion of the screw 118 into linear motion of the nut 120 and thrust tube 122.

Having described various embodiments of an electric actuator, the general mode of operation can be described as follows. When the motor 110 is actuated, the rotor 116 is caused to rotate in a first direction. Because the proximal end of the rotor 116 is connected with the hub 128, which is in turn connected to the screw 118, rotation of the rotor results in corresponding rotation of the screw 118 in the first direction.

Because the thrust tube 122 and the nut 120 are prevented from rotating, for example by means of the cam follower 206 of collar 202 being guided within track 208 of the actuator housing 102, which is stationary relative the screw 118, rotation of the screw relative to the housing causes the nut and the thrust tube to move axially or linearly along the screw in a first linear direction. Likewise, if the rotor 116 is caused to rotate in the opposite or second direction, the screw 118 is similarly rotated in the opposite or second direction. This results in the nut 120 and the thrust tube 122 being moved axially or linearly in the opposite or second linear direction. Thus, rotational movement of the rotor 116 results in corresponding axial or linear movement of the thrust tube 122, and any tooling connected with workpiece connection member 138.

Electrically powered linear actuators and more particularly an electrically powered actuator 100 having an anti-rotation mechanism may be adapted for a variety of robotic and other applications. In some embodiments, an electrically powered actuator 100 has a housing 102 with a track 208 provided therein and a thrust tube or load transfer member 122 including a cam follower 206. The cam follower 206 is positioned within the track 208 so as to substantially prevent rotation of the thrust tube or load transfer member 122 relative the housing 102.

Alternatively, an electrically powered actuator 100 comprises a housing 102 with a motor 110 within the housing 102. The motor comprises an axially fixed, rotatable hollow rotor 116, an axially fixed, externally threaded elongated screw shaft or lead screw 118 operably coupled to the hollow rotor 116 and capable of rotating therewith, and a rotationally fixed, internally threaded nut 120 coupled to the elongated screw shaft 118. Rotation of the screw shaft 118 causes the nut 120 to move axially. A thrust tube or load transfer member 122 is operably connected with nut 120, and comprises an anti-rotation mechanism attached thereto to substantially prevent the thrust tube or load transfer member 122 from rotation relative the housing 102.

In various embodiments, the anti-rotation mechanism comprises a cam follower 206. The cam follower may be positioned to follow a track 208, and the track 208 may be provided in the housing 102. The anti-rotation mechanism may comprise a collar 202 integral with or operably fastened to the thrust tube 122 for operably coupling the cam follower 208 with the thrust tube 122.

In another embodiment, an electrically powered actuator 100 comprises a housing 102 having a track 208 provided therein and a thrust tube member 122 comprising a cam follower 206. The cam follower 206 is positioned within the track 208 so as to substantially prevent rotation of the thrust tube member 122 relative the housing 102.

Although these and other various embodiments of the present disclosure have been described with reference to preferred embodiments, persons skilled in the art will recognize that changes may be made in form and detail without departing from the spirit and scope of the present disclosure. For example, in one embodiment, the rotor 116 may surround a substantial portion of the screw 118 and be supported by bearing 132. In alternative embodiments, the rotor 116 may include a distal free end, which is unsupported. Thus, the rotor may be cantilevered relative to the hub 128 and extend partially along the length of the actuator.

In still other embodiments, the screw 118 may be rotationally fixed, and the nut 120 may be linearly fixed. In such embodiments, the thrust tube 122 may be operably connected with the screw 118. Thus, rotation of the nut 120 results in axial movement of the screw 118 and thus the thrust tube 122.

We claim:

1. A linear actuator assembly comprising:
   a housing;
   a motor disposed within the housing, the motor comprising a hollow rotor positioned radially inward of the housing in a proximal end thereof;
   an externally threaded screw shaft coupled to the hollow rotor for rotation therewith; and
   a thrust tube coupled to an internally threaded nut positioned radially inward of the hollow rotor and in a proximal end of the thrust tube, the nut having an internally threaded portion mating with the externally threaded screw shaft, wherein rotation of the hollow rotor and screw shaft causes the internally threaded nut and thrust tube to move axially along the screw shaft; and
   an anti-rotation mechanism attached to a circumference of the thrust tube in a distal end of the actuator housing and in a distal direction from the nut, the anti-rotation mechanism configured to substantially prevent rotation of the thrust tube relative to the housing.

2. The assembly of claim 1, wherein the anti-rotation mechanism comprises a cam follower attached to the circumference of the thrust tube.

3. The assembly of claim 2, wherein the anti-rotation mechanism comprises a collar for attaching the cam follower around the circumference of the thrust tube.

4. The assembly of claim 3, wherein the collar comprises two pieces coupled together around the circumference of the thrust tube.

5. The assembly of claim 2, wherein the cam follower comprise a roller bearing on a stud.

6. The assembly of claim 2, wherein the cam follower is positioned within a generally linear track or groove to prevent rotation of the thrust tube.

7. The assembly of claim 6, wherein the track or groove is provided in the housing.

8. The assembly of claim 6, wherein the cam follower is provided on the circumference of the thrust tube and the track or groove is provided on the housing.

9. The assembly of claim 1, wherein the nut is positioned within the hollow rotor in the proximal end of the housing and the anti-rotation mechanism is provided within a distal end of the housing, fastened to the circumference of the thrust tube outside the hollow rotor and in the distal direction from the nut.

10. An actuator comprising:
an actuator housing;
an electric motor disposed within the actuator housing and comprising a hollow rotor positioned within and radially inward of the actuator housing in a proximal end thereof;
a linear thrust mechanism positioned inward of the hollow rotor, the linear thrust mechanism comprising an externally threaded screw shaft rotationally coupled to the hollow rotor and an internally threaded nut positioned radially inward of the hollow rotor and having an internally threaded portion mating with the externally threaded screw shaft;
a thrust tube connected to the internally threaded nut in a proximal end of the thrust tube, wherein rotational motion of the hollow rotor and screw shaft is converted to linear motion of the internally threaded nut and thrust tube axially along the screw shaft;
a guide extending along a linear range of the thrust tube; and
an anti-rotation mechanism attached to a circumference of the thrust tube in a distal end of the actuator housing and in a distal direction from the nut, the anti-rotation mechanism comprising a cam follower following the guide to substantially prevent rotation of the thrust tube relative to the housing.

11. The actuator of claim 10, further comprising a collar fastened around the circumference of the thrust tube to attach the cam follower.

12. The actuator of claim 11, further comprising means for coupling two portions of the collar together around the circumference of the thrust tube.

13. The actuator of claim 10, wherein the track is provided in the actuator housing and has a length substantially equivalent to a linear range of the thrust tube.

14. The actuator of claim 13, wherein the cam follower comprises a stud positioned within the track.

15. The actuator of claim 14, where the cam follower comprises a roller bearing on the stud.

16. An electrically powered linear actuator comprising:
an actuator housing having a track provided therein;
an electric motor disposed within the actuator housing and having a hollow rotor positioned radially inward of the actuator housing in a proximal end thereof;
an externally threaded lead screw rotationally coupled to the hollow rotor;
an internally threaded nut positioned radially inward of the hollow rotor and having an internally threaded portion mating with the externally threaded lead screw;
a load transfer member comprising a thrust tube coupled to the nut in a proximal end of the thrust tube; and
an anti-rotation mechanism attached to a circumference of the thrust tube of the load transfer member in a distal end of the actuator housing and in a distal direction from the nut, the anti-rotation mechanism comprising a cam follower positioned within the track so as to substantially prevent rotation of the thrust tube relative to the actuator housing, thereby converting rotational motion of the lead screw into linear motion of the load transfer member and thrust tube, the linear motion extending axially along the externally threaded lead screw.

17. The actuator of claim 16, wherein the cam follower comprises a roller bearing on a stud.

18. The actuator of claim 16, wherein the lead screw is axially fixed and the nut moves axially along the lead screw to convert the rotational motion of the lead screw to linear motion of the load transfer member.

19. The actuator of claim 18, wherein the electric motor is provided in the proximal end of the actuator housing and the lead screw extends beyond the hollow rotor of the electric motor within a distal end of the actuator housing.

20. The actuator of claim 16, wherein the nut is positioned within the hollow rotor in the proximal end of the housing and the anti-rotation mechanism is fastened to the circumference of the thrust tube outside the hollow rotor and in the distal direction from the nut.

* * * * *